Oct. 30, 1934.   D. SWEENEY   1,979,084
PROCESS OF PRODUCING SPOTTED EFFECTS ON NOVELTIES, ETC
Filed Nov. 6, 1930
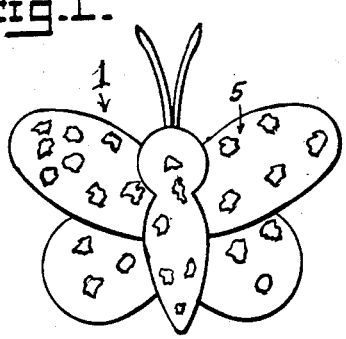
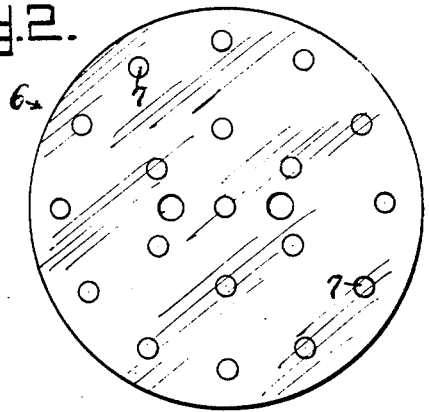
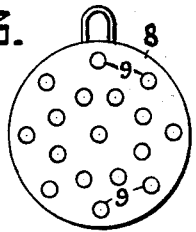
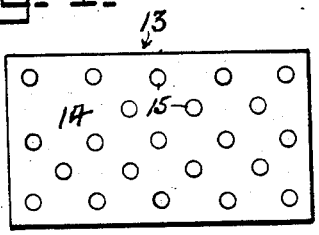
INVENTOR
Dennis Sweeney.

Patented Oct. 30, 1934

1,979,084

UNITED STATES PATENT OFFICE 1,979,084

PROCESS OF PRODUCING SPOTTED EFFECTS ON NOVELTIES, ETC.

Dennis Sweeney, Farmingdale, N. Y.

Application November 6, 1930, Serial No. 493,906

4 Claims. (Cl. 41—36)

This invention relates to the manufacture of buttons, novelties, etc., and has for its object to provide spotted and mottled effects either in black and white, colors, or combination of colors, regular or irregular in design.

A further object of the invention is to provide a process of producing on articles, a surface of black and white, colors, or combination of colors, said colors being either in dots of various sizes or in shaped particles or forms of various sizes.

And finally the object of the invention is to provide means whereby a pleasing and artistic surface may be applied to articles of manufacture at an extremely low cost of production.

With the above and such other objects in view as may hereinafter more fully appear, I have invented the device shown in the accompanying drawing, in which:

Figure 1 is a plan view of an ornamental butterfly embracing my invention;

Figure 2 is a similar view of a button embracing the invention;

Figure 3 is an elevational view of the pendant made according to my invention;

Figure 4 is a similar view of a tile.

In carrying out my process for producing spotted, mottled or other effects on various articles, of manufacture, I take cellulose acetate as a base, celluloid, bakelite, or any other equivalent mouldable material, which can be had in a semi-liquid or putty-like state, and dip its outer surface into properly prepared granular substances of any desired material, color or mixture of colors; then press the material into a desired mould; then allow the same to properly harden, whereupon the desired ornamental spotted or other desired effect is obtained, the said granules being held in the material through the shrinkage of said material in drying out and hardening. The original surface of the article being moulded will be perfectly smooth and glazed if the mould is so formed.

It will be obvious that in carrying out this method of producing the desired ornamental effect each article so ornamented will be different in design, from each other article, as each such design will depend upon the particular amount and spacing of the granules, which will adhere to the surface of the mould when dipped therein. Of course, the approximate quantity of granules applied on each moulded surface may be regulated by the manner of spacing the granules on the table, or surface upon which they are spread for use.

In Figure 1 of the drawing I illustrate an ornamental butterfly 1, made according to my invention, in which the vari-colored spots 2, 3, 4, etc., have been embedded into the surface 5 thereof, through my above described process. In this case the body of the article is formed from material in a putty state, and the granules from the same material in a granular state. These granules may be of various sizes and shapes, such as stars, spheres, triangles, etc. It is obvious that the granules may also be worked into the body of the material, and will show through the same when said body is of a transparent nature, or semi-transparent.

In Figure 2 of the drawing the button 6 has the granules 7 worked into the body of the material which is transparent or semi-transparent.

In Figure 3 is illustrated a pendant 8, the entire outer surface thereof having moulded thereto the spots 9 of one or more colors.

In Figure 4 is illustrated a tile 13, in one part of its surface 14 provided with the ornamental colored spots 15. It is obvious that any portion or all of the surface of the article may be ornamented.

Another method under which a similar process of manufacture of ornamental designs may be used is as follows: Take an article already moulded into form from mouldable organic materials as above specified, and having a flat surface, then coat the surface with a solution of acetone to soften said surface, then apply the ornamenting granules in any suitable manner, for instance, as above described, or by sprinkling, then pressing said surface tightly upon a smooth, hard surface until fully set, and the article is decorated.

Acetone may be applied to the surface of the article being ornamented by means of a rubber stamp or a brush dipped in acetone with which to form various designs on the article either before or after casting and recast in same mould.

The granules used for ornamentation may be formed either regular or irregular in design, such as disks, clips, or the like.

Having described my invention, that which I claim to be new, and desire to procure by Letters Patent is:

1. A method of ornamentation of articles formed of a mouldable material consisting in wetting them with a solvent to soften the surface, applying granules of the same material to the wet surface, and allowing the articles to dry.

2. A method of ornamentation of articles formed of a mouldable material consisting in wetting them with a solvent to soften the surface, applying granules of the same material but of a different color to the wet surface, and allowing the articles to dry.

3. A method of ornamentation of articles formed of a mouldable organic material consisting in wetting them with a solvent to soften the surface, applying granules of organic material soluble in the same solvent but of different color to the wet surface, and allowing the articles to dry.

4. A method of ornamentation of articles formed of a mouldable organic material consisting in wetting them with a solvent to soften the surface, applying granules of mouldable organic material soluble in the same solvent but of different color to the wet surface, and allowing the articles to dry.

DENNIS SWEENEY.